April 16, 1957  J. W. HUTCHINS  2,789,230
TEMPERATURE COMPENSATOR
Filed March 19, 1954
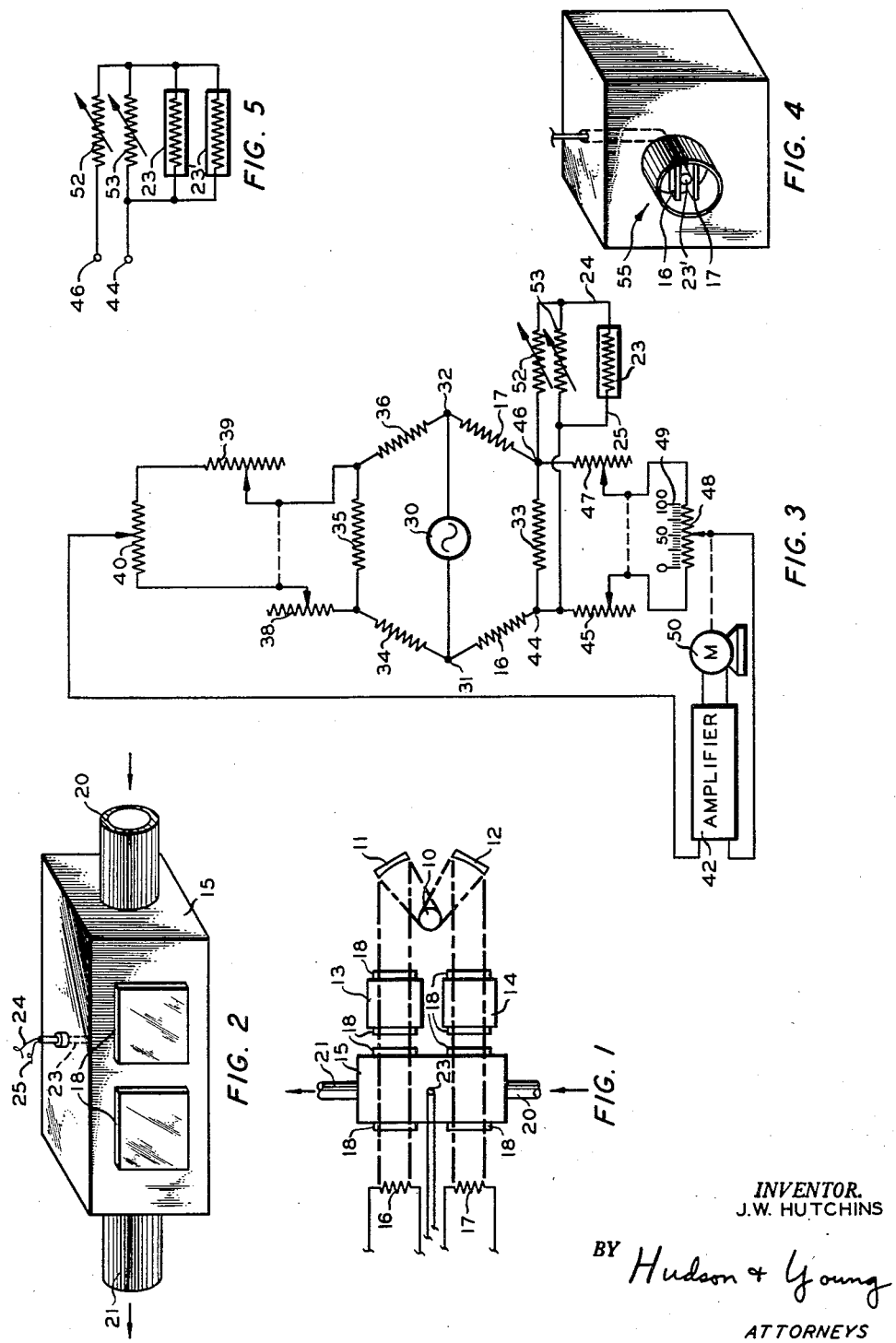
INVENTOR.
J. W. HUTCHINS
BY Hudson & Young
ATTORNEYS

United States Patent Office 2,789,230
Patented Apr. 16, 1957

2,789,230

TEMPERATURE COMPENSATOR

Joseph W. Hutchins, Bartlesville, Okla., assignor to Phillips Petroleum Company, a corporation of Delaware Application March 19, 1954, Serial No. 417,462

19 Claims. (Cl. 250—43.5)

This invention relates to the analysis of fluid streams by passing radiation therethrough. In another aspect it relates to means to compensate analyzers for temperature changes.

Automatic infrared analyzers have recently been developed to measure and record the infrared rediation absorbed by sample streams. Since it is known that a large number of substances absorb radiation at wave lengths characteristic of the particular substance, this procedure affords a valuable method of analyzing fluid streams. Analyzers of this type are being employed extensively at present in chemical and petroleum industries for analysis and control purposes.

One of the difficulties that has been encountered with these analyzers is a definite and noticeable drift which often takes place on the recording chart. It has become apparent that one of the important factors causing this drift is temperature variations of the sample being analyzed. For example, if the temperature of a gas increases, assuming the pressure remains constant, the gas becomes less dense. Accordingly, the radiation absorbed by a given volume of the gas decreases as the temperature increases. It has been found, for example, that a temperature change of 20° F. in a sample stream of natural gas of constant composition may be sufficient to cause as much as a 5 percent drift in the analyzer reading. If such a temperature change occurs gradually during an analysis, a continuous drift occurs on the recorder chart. Temperature changes are likely to occur, for example, in making field gas analyses using portable equipment. A change in temperature results in a change in radiation absorption by a given fluid sample. This, in effect, changes the sensitivity of the analyzer because of the change in the radiation absorption due to change in density. This sensitivity drift is separate from the zero drift which can be corrected by the system shown in my Patent 2,579,825.

In accordance with the present invention, means are provided for compensating the electrical circuitry associated with an analyzer for temperature changes in the sample material. This compensation is accomplished by inserting one or more temperature sensitive resistance elements having negative coefficients of thermal resistivity in the bridge detecting circuit. These temperature sensitive resistance elements are disposed in the analyzer at regions which are likely to be affected by temperature changes. For example, one of these elements can be positioned in the sample cell in thermal contact with the fluid stream. In this manner the resistance of the compensating elements varies in a manner such that the output signal of the analyzer remains constant irrespective of temperature changes of the material being analyzed.

Accordingly, it is an object of this invention to provide an optical analyzer having temperature compensating means incorporated therein.

Another object is to provide an electrical bridge measuring circuit which includes a temperature compensating resistance element having a negative coefficient of thermal resistivity.

A further object is to provide a temperature compensator for use with analyzers wherein the composition of a gaseous material is measured in terms of the radiation absorbing properties of the material.

Various other objects, advantages, and features of this invention should become apparent from the following detailed description taken in conjunction with the accompanying drawing in which:

Figure 1 is a schematic representation of the optical system of an analyzer of the type to which this invention pertains;

Figure 2 illustrates the sample cell of the analyzer of Figure 1 having a temperature compensating resistance element incorporated therein;

Figure 3 is a schematic circuit diagram of the electrical detecting circuit employed with the analyzer of Figure 1;

Figure 4 illustrates a form of radiation detector having a temperature responsive resistance element associated therewith; and Figure 5 is a modified form of the electrical circuitry of this invention.

Referring now to the drawing in detail and to Figure 1 in particular, there is shown a source 10 of infrared or other suitable radition from which two beams are directed against a pair of concave reflectors 11 and 12. The respective beams of radiation are reflected through respective cells 13 and 14 and through a common cell 15 to impinge upon respective radiation responsive elements 16 and 17, which can be bolometers, for example. Cells 13, 14 and 15 are provided with windows 18 which are transparent to the radiation employed. When source 10 provides infrared radiation, the windows may be formed from a halide such as silver chloride, calcium fluoride, sodium fluoride or from quartz. In one embodiment of this invention cell 14 preferably is filled with a material having radiation absorption properties approximating those of the material being analyzed. For example, cell 14 can be filled with a pure sample of the material to be detected. Cell 13 contains air or other substances transparent to the radiation emitted by source 10. The fluid to be tested is admitted to sample cell 15 by an inlet conduit 20 and leaves the cell through an outlet conduit 21.

A temperature sensitive resistance element 23 having a negative coefficient of thermal resistivity is positioned within cell 15 so as to be in thermal contact with the fluid passed therethrough. Electrical leads 24 and 25 connect element 23 into the bridge circuit illustrated in Figure 2. Element 23 preferably is formed of a semi-conducting material having a large coefficient of thermal resistivity. Elements of this type are commonly referred to as thermistors. Element 23 can be positioned either within the interior of cell 15 to make direct thermal contact with the fluid passed therethrough or it can be embedded in the wall of cell 15, provided the cell is constructed of a material having good heat conducting properties. As will be explained hereinafter in greater detail, a plurality of these elements can be employed if desired.

The beams of radiation incident upon elements 16 and 17 produce temperature changes which vary the electrical resistance of these elements. With the apparatus arranged as described, any change in the relative resistances of elements 16 and 17 indicates the amount or percentage of the material or component being detected in the sample stream circulated through cell 15. This should be apparent because the initial intensity of the beam impinging upon element 17 is reduced by an amount representative of the radiation absorbed by the pure material in cell 14. If this material is absent in the sample stream there will be a maximum difference in intensity of radiation impinging upon elements 16 and 17. However, as the percentage of this material increases in the sample stream, the difference in intensity between the two radiation beams becomes less due to the corresponding absorption of radiation of this material in cell 15. It should, of course, be apparent that the principles of this invention are not necessarily restricted to the particular analyzer illustrated since other types of filtering systems can be employed and radiation in other portions of the spectrum can be utilized for certain analyses.

Elements 16 and 17 are connected in the bridge circuit illustrated in Figure 3. A source of voltage 30, which preferably provides alternating current, is employed to energize the detecting circuit. One terminal of voltage source 30 and one terminal of element 16 are connected to a bridge terminal 31. The second terminal of source 30 and one terminal of element 17 are connected to a bridge terminal 32. A resistor 33 is connected between the second end terminals of elements 16 and 17. Resistors 34, 35 and 36 are connected in series relation between bridge terminals 31 and 32. The end terminal of a first variable resistor 38 is connected to the junction between resistors 34 and 35, and the contactor of a second variable resistor 39 is connected to the junction between resistors 35 and 36. The contactor of resistor 38 is connected to one end terminal of a potentiometer 40, and the end terminal of resistor 39 is connected to the second end terminal of potentiometer 40. The contactors of resistors 38 and 39 are mechanically coupled to one another so that adjustment of these resistors increases the resistance of one and decreases the resistance of the other. The contactor of potentiometer 40 is connected to one input terminal of an amplifier 42.

The junction 44 between element 16 and resistor 33 is connected to the end terminal of a variable resistor 45. The junction 46 between element 17 and resistor 33 is connected to the end terminal of a variable resistor 47. The contactors of resistors 45 and 47 are connected to the respective end terminals of a potentiometer 48 which can be provided with a suitable scale 49 to indicate the position of the contactor thereon. Scale 49 can be calibrated to indicate the percentage of the particular substance under analysis in the sample stream. The contactors of resistors 45 and 47 are mechanically coupled to one another such that adjustment of the resistance of one of these resistors changes the resistance of the other by a corresponding amount. The contactor of potentiometer 48 is connected to the second input terminal of amplifier 42. The output of amplifier 42 is applied to a reversible motor 50, the drive shaft of which is mechanically coupled to the contactor of potentiometer 48.

It should be apparent that the circuit thus far described is a modified form of self-balancing Wheatstone bridge. When a potential is applied between bridge terminals 31 and 32, the contactors of potentiometers 40 and 48 can be adjusted so that there is a zero potential difference therebetween. This adjustment is accomplished by motor 50 which moves the contactor of potentiometer 48 in the direction necessary to eliminate a potential difference between the input terminals of amplifier 42. Servo-mechanism of this type is well known in the art and can be of the form described in the copending application of J. R. Parsons, Serial No. 299,515, filed July 14, 1952, for example. Ganged resistors 38 and 39 provide an auxiliary bridge balance control since adjustment of this pair of resistors increases the resistance on one side of potentiometer 40 and decreases the resistance on the other side. Ganged resistors 45 and 47 are provided to adjust the sensitivity of the bridge circuit. When the contactors of these resistors are moved so that large resistances are included in circuit with potentiometer 48, the movement of the contactor of potentiometer 48 needed for a given potential difference is greater than when the series resistance of resistors 45 and 47 is reduced. This is evident because of the voltage dividing network formed by resistors 45 and 47 and potentiometer 48. When the resistance of elements 45 and 47 is large, a smaller percent of the potential drop between terminals 44 and 46 appears across potentiometer 48.

The bridge circuit thus far described is of substantially the same form as shown in my Patent 2,579,825, and can be provided with an automatic standardization system of the type shown in said patent if desired. The present invention is directed toward the temperature compensator which is connected in the bridge circuit. Terminal 46 is connected to one end terminal of a variable resistor 52 and terminal 44 is connected to one end terminal of a variable resistor 53. The second end terminals of resistors 52 and 53 are connected to one another. Thermistor 23 is connected in shunt with variable resistor 53.

As previously mentioned, an increase in temperature of the sample stream being analyzed results in the stream becoming less dense such that the radiation absorbed thereby is diminished. If this should happen the radiation impinging upon element 16 increases, which in turn increases the temperature of element 16 and its resistance, assuming element 16 has a positive temperature coefficient of resistivity. If the bridge circuit were balanced initially with the contactor of potentiometer 48 but at the midpoint of scale 49, motor 50 is energized as a result of the temperature change to move the contactor of potentiometer 48 toward the lower end of the scale at the left. This adjustment effectively decreases the resistance in series with element 16 and increases the resistance in circuit with element 17 until the bridge is once again balanced. Thus, a temperature change in the sample stream is indicated on scale 49 by a lower reading. However, in accordance with the present invention this drift is eliminated by the compensating network including thermistor 23 and resistors 52 and 53.

Considering only thermistor 23, it should be evident that an increase in temperature of the sample fluid results in an increase in temperature of thermistor 23 which reduces the resistance thereof. A reduction in the resistance of thermistor 23 results in a greater current flow therethrough so that the current flow through potentiometer 48 is decreased. The effective resistance between terminals 44 and 46 is likewise decreased. This decrease in current flow through potentiometer 48 requires that the contactor thereof be moved closer to terminal 46 to restore the bridge to a balanced condition. In this manner the previously described drift is eliminated. The purpose of resistors 52 and 53 is to adjust the effective resistance of thermistor 23 such that the temperature compensation exactly balances the temperature drift caused by a change in temperature of the sample stream.

If temperature changes are likely to occur in the vicinity of detector elements 16 and 17, a second thermistor 23' can be mounted adjacent to these elements in the detector unit 55 illustrated in Figure 4. As shown in Figure 5, thermistor 23' is connected in parallel with thermistor 23. Furthermore, in some applications it is desired to employ more than one temperature compensating thermistor in cell 15 to measure temperature at various portions thereof. These additional thermistors can also be connected in parallel with thermistor 23. The equivalent resistance of these parallel connected thermistors is modified by adjustment of variable resistors 52 and 53 until the equivalent thermistor resistance is of the proper value to compensate for the temperature drift of the analyzer.

From the foregoing description it should be apparent that there is provided in accordance with this invention a temperature compensating circuit which can be employed in conjunction with a radiation detecting circuit to eliminate drift due to temperature changes in the sample being analyzed. Although the invention has been described with elements 16 and 17 having positive temperature coefficients of resistivity and elements 23 having negative temperature coefficients, it should be apparent

What is claimed is:

1. An analyzer comprising, in combination, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, first and second impedance elements connected in series relation with said voltage source, a potentiometer, the end terminals of said potentiometer being connected to respective first end terminals of said first and second resistance elements, the second end terminals of said first and second resistance elements being connected to respective terminals of said voltage source, current indicating means connected between the contactor of said potentiometer and the junction between said first and second impedance elements, and a third temperature sensitive resistance element disposed in thermal contact with said sample cell, the end terminals of said third element being connected to the respective end terminals of said potentiometer, the resistance of said third element varying with temperature in a manner opposite the change in resistance of said first and second resistance elements with change in temperature.

2. The combination in accordance with claim 1 wherein said first and second resistance elements have positive temperature coefficients of resistivity and said third element has a negative temperature coefficient of resistivity.

3. The combination in accordance with claim 2 further comprising a first resistor connected in series with said third element and a second resistor connected in parallel with said third element.

4. An analyzer comprising, in combination, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, first and second impedance elements connected in series relation with said voltage source, a potentiometer, the end terminals of said potentiometer being connected to respective first end terminals of said first and second resistance elements, the second end terminals of said first and second resistance elements being connected to respective terminals of said voltage source, current indicating means connected between the contactor of said potentiometer and the junction between said first and second impedance elements, and a plurality of third temperature sensitive resistance elements connected in parallel relation with one another to form a resistance unit, said third elements being disposed in regions of the analyzer in thermal contact with the sample to be analyzed in said sample cell, the end terminals of said resistance unit being connected to the respective end terminals of said potentiometer, the resistances of said third elements varying with temperature in a manner opposite the change in resistance of said first and second resistance elements with change in temperature.

5. An analyzer comprising, in combination, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, a first resistor having one terminal connected to the first terminal of said voltage source, a second resistor having one terminal connected to the second terminal of said first resistor, a third resistor having one terminal connected to the second terminal of said second resistor, the second terminal of said third resistor being connected to the second terminal of said voltage source, a first variable resistor having one terminal connected to the junction between said first and second resistors, a second variable resistor having one terminal connected to the junction between said second and third resistors, a first potentiometer, the end terminals of said first potentiometer being connected to the respective second terminals of said first and second variable resistors, a second potentiometer, the end terminals of said second potentiometer being connected to respective first end terminals of said first and second resistance elements, the second end terminals of said first and second resistance elements being connected to respective terminals of said voltage source, current indicating means connected between the contactors of said first and second potentiometers, and a third temperature sensitive resistance element disposed in thermal contact with said sample cell, the end terminals of said third element being connected to the respective end terminals of said second potentiometer, the resistance of said third element varying with temperature in a manner opposite the change in resistance of said first and second resistance elements with change in temperature.

6. An analyzer comprising, in combination, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, first and second impedance elements connected in series relation with said voltage source, a first resistor, the terminals of said first resistor being connected to respective first terminals of said first and second resistance elements, the second end terminals of said first and second resistance elements being connected to respective terminals of said voltage source, a first variable resistor having one terminal connected to the junction between said first resistor and said first resistance element, a second variable resistor having one terminal connected to the junction between said first resistor and said second resistance element, a potentiometer, the end terminals of said potentiometer being connected to respective second terminals of said first and second variable resistors, current indicating means connected between the contactor of said potentiometer and the junction between said first and second impedance elements, and a third temperature sensitive resistance element disposed in thermal contact with said sample cell, the end terminals of said third element being connected to the respective end terminals of said potentiometer, the resistance of said third element varying with temperature in a manner opposite the change in resistance of said first and second resistance elements with change in temperature.

7. An analyzer comprising, in combination, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, a first resistor having one terminal connected to the first terminal of said voltage source, a second resistor having one terminal connected to the second terminal of said first resistor, a third resistor having one terminal connected to the second terminal of said second resistor, the second terminal of said third resistor being connected to the second terminal of said voltage source, a first variable resistor having one terminal connected to the junction between said first and second resistors, a second variable resistor having one terminal connected to the junction between said second and third resistors, a first potentiometer, the end terminals of said first potentiometer being connected to the respective second terminals of said first and second variable resistors, first and second impedance elements connected in series relation with said voltage source, a fourth resistor, the terminals of said fourth resistor being connected to respective first terminals of said first and second resistance elements, the second end terminals of said first and second resistance elements being connected to respective terminals of said voltage source, a third variable resistor having one terminal connected to the junction between said fourth resistor and said first resistance element, a fourth variable resistor having one terminal connected to the junction between said fourth resistor and said second resistance element, a second potentiometer, the end terminals of said second potentiometer being connected to respective second terminals of said third and fourth variable resistors, current indicating means connected between the contactors of said first and second potentiometers, and a third temperature sensitive resistance element disposed in thermal contact with said sample cell, the end terminals of said third element being connected to the respective end terminals of said fourth resistor, the resistance of said third element varying with temperature in a manner opposite the change in resistance of said first and second resistance elements with change in temperature.

8. The combination in accordance with claim 7 further comprising a fifth resistor connected in series with said third temperature sensitive resistance element, and a sixth resistor connected in parallel with said third temperature sensitive resistance element.

9. An analyzer comprising, in combination, a source of radiation, first and second temperature sensitive resistance elements, a sample cell, means to direct first and second beams of radiation from said source through said sample cell to impinge upon respective ones of said first and second resistance elements, filter means disposed in one of said beams, a voltage source, a first resistor having one terminal connected to the first terminal of said voltage source, a second resistor having one terminal connected to the second terminal of said first resistor, a third resistor having one terminal connected to the second terminal of said second resistor, the second terminal of said third resistor being connected to the second terminal of said voltage source, a first variable resistor having one terminal connected to the junction between said first and second resistors, a second variable resistor having one terminal connected to the junction between said second and third resistors, said first and second variable resistors being adjustable in unison whereby an increase in resistance of one of said resistors decreases the resistance of the other, a first potentiometer, the end terminals of said first potentiometer being connected to the respective second terminals of said first and second variable resistors, first and second impedance elements connected in series relation with said voltage source, a fourth resistor, the terminals of said fourth resistor being connected to respective first terminals of said first and second resistance elements, the second end terminals of said first and second resistance elements being connected to respective terminals of said voltage source, a third variable resistor having one terminal connected to the junction between said fourth resistor and said first resistance element, a fourth variable resistor having one terminal connected to the junction between said fourth resistor and said second resistance element, said third and fourth variable resistors being adjustable in unison whereby an increase in resistance of one of said resistors increases the resistance of the other, a second potentiometer, the end terminals of said second potentiometer being connected to respective second terminals of said third and fourth variable resistors, means to indicate a potential difference between the contactors of said first and second potentiometers, means responsive to said last-mentioned means to adjust the contactor of said second potentiometer until said potential difference is zero, and a third temperature sensitive resistance element disposed in thermal contact with said sample cell, the end terminals of said third element being connected to the respective end terminals of said fourth resistor, said third temperature sensitive resistance element having a negative coefficient of thermal resistivity and said first and second temperature sensitive resistance elements having positive coefficients of thermal resistivity, a fifth resistor connected in series with said third temperature sensitive resistance element, and a sixth resistor connected in parallel with said third temperature sensitive resistance element.

10. An electrical indicating circuit comprising, in combination, first and second temperature sensitive resistance elements, a voltage source, first and second impedance elements connected in series relation with said voltage source, a potentiometer, the end terminals of said potentiometer being connected to respective first end terminals of said first and second resistance elements, the second end terminals of said first and second resistance elements being connected to respective terminals of said voltage source, current indicating means connected between the contactor of said potentiometer and the junction between said first and second impedance elements, and a third temperature sensitive resistance element, the end terminals of said third element being connected to the respective end terminals of said potentiometer, the resistance of said third element varying with temperature in a manner opposite the change in resistance of said first and second resistance elements with change in temperature.

11. The combination in accordance with claim 10 wherein said first and second resistance elements have positive temperature coefficients of resistivity and said third element has a negative temperature coefficient of resistivity.

12. The combination in accordance with claim 11 further comprising a first resistor connected in series with said third element and a second resistor connected in parallel with said third element.

13. An electrical indicating circuit comprising, in combination, first and second temperature sensitive resistance elements, a voltage source, first and second impedance elements connected in series relation with said voltage source, a potentiometer, the end terminals of said potentiometer being connected to respective first end terminals of said first and second resistance elements, the second end terminals of said first and second resistance elements being connected to respective terminals of said voltage source, current indicating means connected between the contactor of said potentiometer and the junction between said first and second impedance elements, and a plurality of third temperature sensitive resistance elements connected in parallel relation with one another to form a resistance unit, the end terminals of said resistance unit being connected to the respective end terminals of said potentiometer, the resistances of said third elements varying with temperature in a manner opposite the change in resistance of said first and second resistance elements with change in temperature.

14. An electrical indicating circuit comprising, in combination, first and second temperature sensitive resistance elements, a voltage source, a first resistor having one terminal connected to the first terminal of said voltage source, a second resistor having one terminal connected to the second terminal of said first resistor, a third resistor having one terminal connected to the second terminal of said second resistor, the second terminal of said third resistor being connected to the second terminal of said voltage source, a first variable resistor having one terminal connected to the junction between said first and second resistors, a second variable resistor having one terminal connected to the junction between said second and third resistors, said first and second variable resistors being adjustable in unison whereby an increase in resistance of one of said resistors decreases the resistance of the other, a first potentiometer, the end terminals of said first potentiometer being connected to the respective second terminals of said first and second variable resistors, first and second impedance elements connected in series relation with said voltage source, a fourth resistor, the terminals of said fourth resistor being connected to respective first terminals of said first and second resistance elements, the second end terminals of said first and second resistance elements being connected to respective terminals of said voltage source, a third variable resistor having one terminal connected to the junction between said fourth resistor and said first resistance element, a fourth variable resistor having one terminal connected to the junction between said fourth resistor and said second resistance element, said third and fourth variable resistors being adjustable in unison whereby an increase in resistance of one of said resistors increases the resistance of the other, a second potentiometer, the end terminals of said second potentiometer being connected to respective second terminals of said third and fourth variable resistors, means to indicate a potential difference between the contactors of said first and second potentiometers, means responsive to said last-mentioned means to adjust the contactor of said second potentiometer until said potential difference is zero, and a third temperature sensitive resistance element disposed in thermal contact with said sample cell, the end terminals of said third element being connected to the respective end terminals of said fourth resistor, said third temperature sensitive resistance element having a negative coefficient of thermal resistivity and said first and second temperature sensitive resistance elements having positive coefficients of thermal resistivity, a fifth resistor connected in series with said third temperature sensitive resistance element, and a sixth resistor connected in parallel with said third temperature sensitive resistance element.

15. An analyzer comprising, a source of radiation, first and second temperature sensitive resistance elements, a sample cell, means to direct first and second beams of radiation from said source to impinge upon respective ones of said first and second resistance elements, at least one of said beams being directed through said sample cell, a voltage source, first and second impedance elements connected in series relation with said voltage source, a potentiometer, the end terminals of said potentiometer being connected to respective end terminals of said first and second resistance elements, the second end terminals of said first and second resistance elements being connected to respective terminals of said voltage source, current responsive means connected between the contactor of said potentiometer and the junction between said first and second impedance elements, and a third temperature sensitive resistance element having the end terminals thereof connected to respective end terminals of said potentiometer, said third temperature sensitive resistance element being positioned in thermal contact with a portion of said analyzer, the resistance of said third element varying with temperature in a manner opposite the change in resistance of said first and second resistance elements with a change in temperature.

16. The combination in accordance with claim 15 wherein said third temperature sensitive resistance element is disposed in closely spaced relationship with said first and second resistance elements.

17. An analyzer comprising a source of radiation, a sample cell, first and second radiation detecting elements, an electrical bridge measuring circuit including said detecting elements, said bridge measuring circuit providing an output signal representative of the difference in radiation impinging upon said two detecting elements, means to direct first and second beams of radiation from said source to impinge upon respective ones of said detecting elements, at least one of said beams being directed through said sample cell, a temperature sensitive element positioned in thermal contact with said sample cell, and means responsive to the output of said temperature sensitive element to vary the output signal of said bridge measuring circuit responsive to temperature changes of said sample cell.

18. An analyzer comprising a source of infrared radiation, a sample cell, first and second temperature sensitive resistance elements, an electrical bridge measuring circuit including said resistance elements, said bridge measuring circuit providing an output signal representative of the difference in radiation impinging upon said two resistance elements, means to direct first and second beams of radiation from said source to impinge upon respective ones of said resistance elements, at least one of said beams being directed through said sample cell, a third temperature sensitive resistance element positioned in thermal contact with said sample cell, and means connecting said third resistance element in said bridge measuring circuit to vary the output signal of said bridge measuring circuit responsive to temperature changes of said sample cell.

19. The combination in accordance with claim 18 wherein the resistance of said third element changes with temperature changes opposite to the changes in resistance of said first and second elements with like changes in temperature.

References Cited in the file of this patent
UNITED STATES PATENTS

| | | |
|---|---|---|
| 2,621,297 | Obermaier | Dec. 9, 1952 |
| 2,666,854 | Hutchins | Jan. 19, 1954 |